(12) United States Patent
Terry

(10) Patent No.: US 7,111,967 B2
(45) Date of Patent: Sep. 26, 2006

(54) HUB LIGHT

(76) Inventor: Dennis T. Terry, 45 Henry Ave., Selden, NY (US) 11784

( * ) Notice: Subject to any disclaimer, the term of this patent is extended or adjusted under 35 U.S.C. 154(b) by 0 days.

(21) Appl. No.: 10/926,484

(22) Filed: Aug. 26, 2004

(65) Prior Publication Data

US 2006/0044817 A1   Mar. 2, 2006

(51) Int. Cl.
   *B60Q 1/26* (2006.01)
(52) U.S. Cl. .................. 362/500; 362/103; 362/191
(58) Field of Classification Search .............. 362/500, 362/190, 191, 103; 301/37.23, 37.32, 37.102, 301/37, 34; 280/11, 19
See application file for complete search history.

(56) References Cited

U.S. PATENT DOCUMENTS

| | | | |
|---|---|---|---|
| 1,643,593 A | 9/1927 | Styer et al. | |
| 2,526,548 A | 10/1950 | Franklin | |
| 3,099,401 A | 7/1963 | Bell | |
| 3,113,727 A | 12/1963 | Bradway | |
| 3,340,389 A | 9/1967 | Senseman | |
| 4,138,160 A | 2/1979 | Lohmeyer | |
| 4,191,427 A | 3/1980 | Bradley | |
| 4,430,692 A | 2/1984 | Papadakis et al. | |
| 4,562,516 A | 12/1985 | Chastain | |
| 4,782,431 A | 11/1988 | Park | |
| 4,881,153 A | 11/1989 | Scott | |
| 4,893,877 A * | 1/1990 | Powell et al. ............... | 362/464 |
| 5,016,144 A | 5/1991 | DiMaggio | |
| 5,040,100 A | 8/1991 | DiGaetano | |
| 5,294,188 A * | 3/1994 | Vancil, Jr. ................ | 301/5.301 |
| 5,392,200 A * | 2/1995 | Milde ......................... | 362/464 |
| 5,465,194 A | 11/1995 | Currie | |
| 5,530,630 A | 6/1996 | Williams, Jr. | |
| 5,558,426 A | 9/1996 | Cabanatan et al. | |
| 5,800,035 A | 9/1998 | Aichele | |
| 6,168,301 B1 | 1/2001 | Martinez et al. | |
| 6,220,733 B1 * | 4/2001 | Gordon ...................... | 362/500 |
| 6,923,561 B1 * | 8/2005 | Castro ........................ | 362/500 |
| 2005/0195612 A1 * | 9/2005 | Cho ........................... | 362/500 |

* cited by examiner

*Primary Examiner*—Y. My Quach-Lee
*Assistant Examiner*—Anabel Ton

(57) ABSTRACT

A hub that lights up that is adapted for detachable affixing to the center rim of automobile hubs and caps. The hub comprises of openings on the outer surface to allow soft led light to illuminate. This led will be powered by a 9 volt battery that's attached to a circuit board with an on-off switch accessible from the outer surface. The alternative power source will be powered by solar energy with a rechargeable battery and a remote control on-off switch. The hub will fasten on to the existing center hub with the electrical unit inside of the hub.

8 Claims, 2 Drawing Sheets

HUB LIGHT

FIELD OF INVENTION

This invention relates generally to automobile accessories. More particularly, the invention relates to hubs and caps which are adapted to provide illumination to the rim, tire and wheel well.

BACKGROUND OF THE INVENTION

Various types of wheel illumination via brakes, spokes, spinners and the like are well known. However, none of the references herein described provides a lighting device which is illuminated on the hub of the rim or cap illuminating inwards towards the rim, tire and wheel Well.

The related art is represented by the following patents of interest.

U.S. Pat. No. 6,644,839, issued on Nov. 11, 2003 to Dennis R. Lee, describes a lighted wheel of a vehicle by projecting light through decorative openings disposed in the rim of the tire. The lighted wheel rim system includes a light unit which is stimulating and aesthetically pleasing to the human eye. The lighted wheel rim system has two major parts, including a light housing assembly and a lighting assembly. Brackets and fasteners are configured to connect the light housing assembly to the brake rotor splash guards or brake shield of a vehicle. The brackets are dimensioned to correspond to the outer curvature, shape, and size of the brake shield and to hold the light housing assembly in spaced apart relation therefrom. Each wheel of a vehicle is configured with a ring light unit as an integrated electrical system. Lee does not suggest a lighted hub light system according to the claimed invention.

U.S. Pat. No. 4,430,692, issued Feb. 7, 1984 to Alexander M. Papadakis et al., describes an automobile vehicle wheel having at least one rotatable wheel that includes alight source mounted to the vehicle, light transmission means operatively associated with the light source, and reflective surface means for reflecting light to produce a visual light illumination effect. Papadakis et Al. does not suggest a lighted hub light system according to the claimed invention.

U.S. Pat. No. 4,782,431, issued on Nov. 1, 1988 to Seung M. Park, describes a lighting apparatus for mounting on vehicle wheels. The apparatus includes a light unit fixed on a wheel member and a miniature magnetometer characterized by its rotor being coaxial with the wheel to produce power by rotation following the rotation of wheels. Park does not suggest a lighted hub light system according to the claimed invention.

U.S. Pat. No. 4,881,153, issued on Nov. 14, 1989 to Russel E. Scott, describes a lighting system for vehicle wheels and includes a disk assembly which facilitates the electrical power source of the vehicle. Further, the lighting system includes a mounting system for mounting a disk to the lugs of the vehicle on the inside of the wheel. The disk includes first and second coaxially mounted electrically conductive rings which remain in continuous electrical contact when rotated relative to each other. The mounting system includes an electrically conductive portion and an insulator portion which electrically separates the mounting assembly from the first and second rings. The electrically conductive portion of the mounting means are used to electrically ground the rotating lights. Scott does not suggest a lighted hub light system according to the claimed invention.

U.S. Pat. No. 4,893,877, issued on Jan. 16, to Manual Powell, describes a lighted hubcap including a cap body that has an outboard side and an opposing inboard side. When the cap body is secured to the wheel of a passenger vehicle, the outboard side faces away from the vehicle. At least one light emitter is incorporated in the cap body so that it emits light from the outboard side of the cap body when energized. A permanent magnet assembly is pivotally secured to the cap body and weighted so that the permanent magnet assembly is in a generally fixed orientation with respect to the passenger vehicle. Electrically conducting windings are secured to the inboard side concentrically about the permanent magnet assembly and are connected to the light emitters. The windings are in magnetic flux coupling relationship with the permanent magnet assembly so that, upon rotation of the wheel, alternating current is generated in the winding for energizing the light emitters. Powell does not suggest a lighted hub light system according to the claimed invention.

U.S. Pat. No. 5,016,144, issued on May 14, 1991 to Darryl DiMaggio, describes an illuminating wheel cover including a momentary rotating mercury switch which gathers mercury during rotation and causes a momentary electrical connection to illuminate light emitting diodes arranged to create an illusionary effect. DiMaggio does not suggest a lighted hub light system according to the claimed invention.

U.S. Pat. No. 5,040,100, issued on Aug. 13, 1991 to Ronald DiGaentano, describes a vehicle wheel well illumination device including a pair of light sources and a resilient rod interconnecting the light sources in a space apart configuration. The resilient rod is capable of elastic deformation under a manual bending effort to bring the rod into a condition suitable to enter a wheel well of a vehicle. Discontinuance of the bending effort causes the rod to partially recover its original form, frictionally engaging the wheel well causing it to be thereby retain in place. DiGaentano does not suggest a lighted hub light system according to the claimed invention.

U.S. Pat. No. 5,465,194, issued on Nov. 7, 1995 to Joseph E. Currie, describes an optical fiber illumination device. Currie does not suggest a lighted hub light system according to the claimed invention.

U.S. Pat. No. 5,530,630, issued on Jan. 25, 1996 to Henry L. Williams, Jr., describes an apparatus for lighting a wheel rotatably mounted on a frame of a vehicle including a source of current mounted on the frame of the vehicle, a commutator mounted to the wheel for rotation therewith, at least one light bulb and a brush electrically connected to the frame adjacent the commutator. The brush has a flow of current from the battery to the commutator so as to power the light bulb. The apparatus is adaptable to cars, motorcycles and semi-truck wheels, whether the wheels are mounted as singles or as duals. Williams, Jr. does not suggest a lighted hub light system according to the claimed invention.

U.S. Pat. No. 5,558,426, issued on Sep. 24, 1996 to Dennis C. Cabanatan et al., describes a set of automobile wheel lights for illuminating the wheels of an automobile in operation at night that includes a plurality of lights, one for each wheel, each mounted on the frame of the automobile near a respective wheel. Each light includes a light bulb in a socket, held fixed at its lighting position at the lighting end of a rigid arm bent towards the wheel of the automobile and mounted onto and extending from the automobile. The light bulb is encased in a protective light bulb cover and lens in one which directs illumination onto the entire outside surface of the wheel. The light bulb in the socket is electrically connected to the power source of the automobile sharing a single switching control with the parking lights and headlights of the automobile. Cabanatan et al. does not suggest a lighted hub light system according to the claimed invention.

U.S. Pat. No. 5,800,035, issued on Sep. 1, 1998 to William E. Aichele, describes a wheel lighting apparatus for use on a vehicle wheel rotatably mounted on a vehicle body. The wheel apparatus includes a chamber mounted to the wheel with a portion of the chamber formed from material which permits the transmission of light therethrough. A light transmitting member is provided for transmitting light from the light source to the outside chamber. The light transmitting member also has a light conducting portion and a light emitting surface. The light received by the light receiving surface travels through the light received by the light conducting portion to the light emitting surface where the light is emitted in a predetermined pattern adjacent to the wheel. An electrical connector device is provided to connect a power source mounted on the vehicle body to the light source. The electrical connector device includes a pair of circular rings of electrically conductive material mounted to the wheel and electrically insulated therefrom. The electrical connector device also includes a pair of contactors mounted to the body, each having an electrically conductive, movable contact portion in electrical contact with their respective circular rings. A pair of electrical connectors are provided for electrically connecting the terminals of the power source to the light source through the flexible contact portion of flexible connectors and their respective rings. Aichele does not suggest a lighted hub light system according to the claimed invention.

U.S. Pat. No. 6,168,301, issued on Jan. 2, 2001 to Martin R. Martinez et al., describes a system for illuminating a wheel on a vehicle. Martinez et al. does not suggest a lighted hub light system according to the claimed invention.

U.S. Pat. No. 4,562,516, issued on Dec. 31, 1985 to Edward H. Chastain, describes an illuminating spinner adapted for detachably affixing to automobile wheel having center hub cap removed therefrom is described. The spinner comprises a plurality of wings having apertures in front walls thereof, a central front opening covered detachably by a cap and a closed rear wall. An adjustable adapter secured to each wig locks the spinner on the wheel. Electrical circuitry situated inside the spinner, including light-emitting diodes in the wings, provides illumination to the spinner. Chastain does not suggest a lighted hub light system according to the claimed invention.

U.S. Pat. No. 4,138,160 to Lhmeyer describes a simulated knock off wheel spinner combined with an adapter which is mounted on the wheel and locked in position by tightening a plurality of set screws. Lhmeyer does not suggest a lighted hub light system according to the claimed invention.

U.S. Pat. No. 4,191,427 to Bradley discloses a wheel spinner nut, which is locked in position on the wheel by a plurality of rigid tabs maintained in place by set screws. Bradley does not suggest a lighted hub light system according to the claimed invention.

U.S. Pat. No. 1,643,593 to Styer et al. describes an electric lamp arranged between a pair of wheel spokes. Styer et al. does not suggest a lighted hub light system according to the claimed invention.

U.S. Pat. No. 2,526,548 to Franklin discloses an electric light mounted in the hub cap of each rear wheel of a vehicle and connected with a regular lightening system of such vehicle, the light being directed by a reflector through two series of openings in the hub cap. Franklin does not suggest a lighted hub light system according to the claimed invention.

U.S. Pat. No. 3,099,401 to Bell describes an illumination means for automobile wheels comprising of translucent plastic spinner provided with an electric bulb and mounted on the central portion of the metallic hub cap, the bulb being connected to the car battery. Bell does not suggest a lighted hub light system according to the claimed invention.

U.S. Pat. No. 3,113,727 to Bradway covers a lighting system for automobile hub caps having lamp sockets grounded to hub caps for holding incandescent bulbs and connected to the automobile battery. Bradway does not suggest a lighted hub light system according to the claimed invention.

U.S. Pat. No. 3,340,389 to Senseman shows a lighted automobile wheel cap provided with a light bulb mounted along the central axis of the wheel cap and receiving electrical power through a spring-loaded brush assembly connected to the power source. Senseman does not suggest a lighted hub light system according to the claimed invention.

While the aforementioned patents taken singularly or in combination, is seen to describe the instant invention as claimed. The present invention provides a new approach to the hub combined with illuminating means.

OBJECTS OF THE INVENTION

It is the object of the invention to a new accessory for the hub that illuminates, the wheel well, tire and rim.

Another object of this invention is to provide for easy installation.

Yet another object is to produce an accessory that can be easily manufactured in mass quantities and is also environmentally safe.

BRIEF SUMMARY OF THE INVENTION

The hub light system according to this invention includes a device that will illuminate the wheel well, tire and rim by projecting light from the hub. It is a device that is easily attachable to the hub assembly of a rim. It includes no moving parts and it has it's own source of power. It includes two major parts: an electrical assembly powered by a replaceable battery and a hub assembly that will hold the electrical unit. The electrical unit is sealed inside of the hub that will transmit light through at least one aperture on the walls covered by translucent material when a manual switch or an alternative remote control switch, that is solar powered, is activated.

Figure 1:
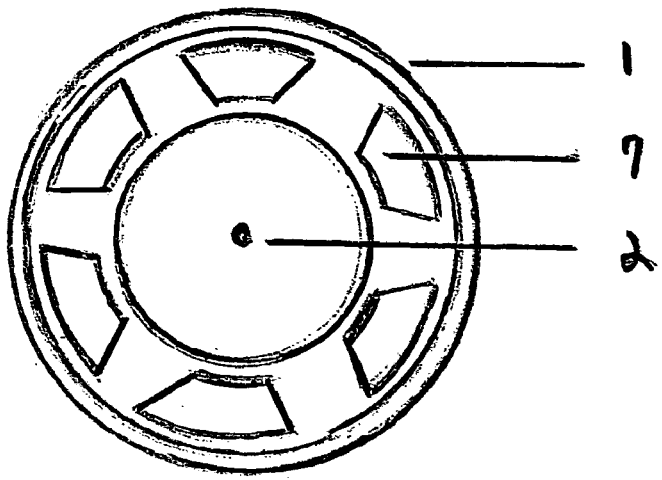
FIG. 1 is a front plan drawing of a hub light according to the invention.

| LIST OF REFERENCE NUMERALS | |
|---|---|
| 1. | Hub Switch |
| 2. | Switch |
| 3. | Fasteners |
| 4. | Electrical Wiring |
| 5. | Circuit Board |
| 6. | LED |
| 7. | Aperture |
| 8. | Battery |
| 9. | Screw |
| 10. | Battery Fastener |
| 11. | Transmitter Remote Control |
| 12. | Receiver |

DETAILED DESCRIPTION

Referring to FIG. 1 the hub light (1) will have at least one aperture (7) surrounding the hub to enable soft light to land on the rim, tire and wheel well of an automobile. These apertures will be sealed with a translucent material to allow the appropriate illumination. Various colors of LED such as blue, green and many other colors may be used. (2) is a toggle switch that will enable the unit to be turned on and off thus allowing control as to when the hub light is to be used.

Figure 2:
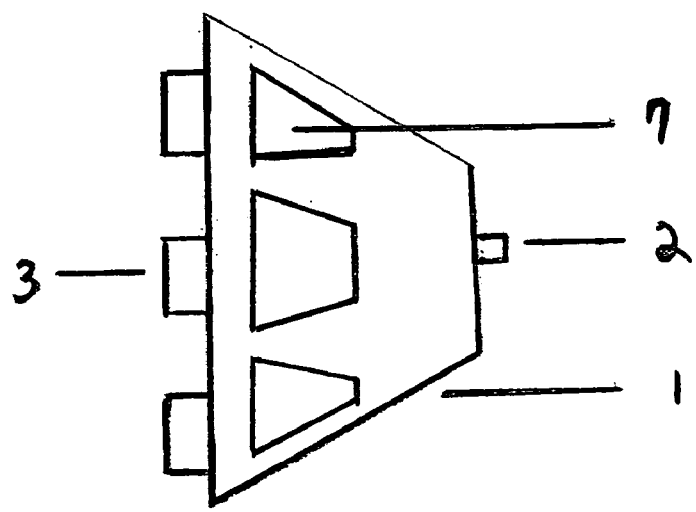
FIG. 2 is a side view of a hub light with fasteners.

Referring to FIG. 2, a side view of the hub, there is at least one fastener, such as snaps (3) to firmly hold the hub light to the rim. These fasteners are firm enough to hold the hub light in place at normal driving speeds while at the same time easy enough to be removed.

Figure 3:
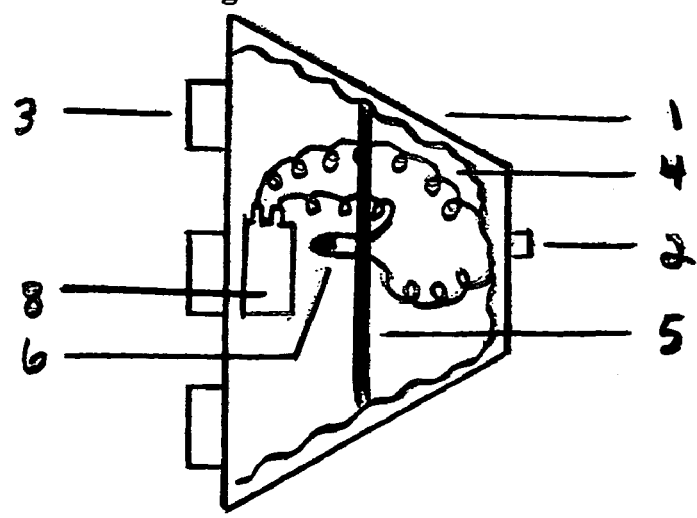
FIG. 3 is a side view of the inside of the hub light with a cross sectional view of the electrical components.

Referring to FIG. 3, an inside section of the side view shows the 9 volt battery (8) power source along with electrical wiring (4) that forms a circuit that can be broken by a switch (2) that leads to the LED (6). The battery will be such that it could easily be replaced yet secure enough to maintain contact for use at normal driving speeds. The LED side of the circuit board (5) will have an illuminating surface made of light tin to carry the soft light further. On the opposite side of the board will have the electrical connection that leads to the switch. This electrical circuit will be situated in the inside of the hub all of which will be sealed with removal plastic to access the battery. The complete circuit provides the hub with illumination that can readily be seen through the apertures on the hub, which is controlled by an on-off switch.

As illustrated in FIGS. 1–3, hub light 1 has a frusto-conical shape.

Figure 4:
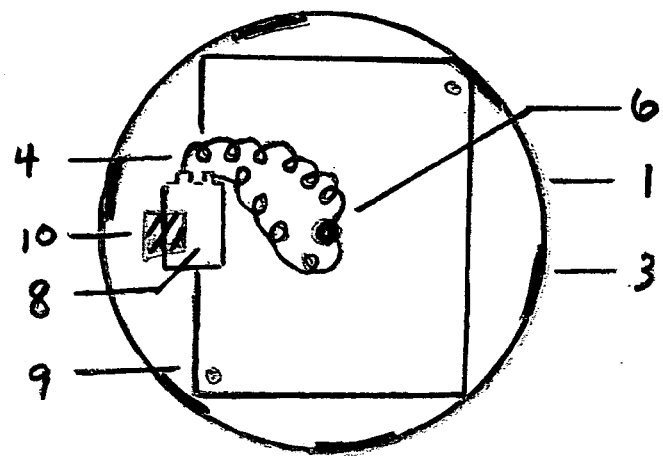
FIG. 4 is a back view of a hub light that is unsealed.

Referring to FIG. 4, the backside of the hub light shows the attachment assembly namely screws (9), a battery fastener (10) and fasteners to enable the unit to remain secure inside of the hub.

Figure 5:
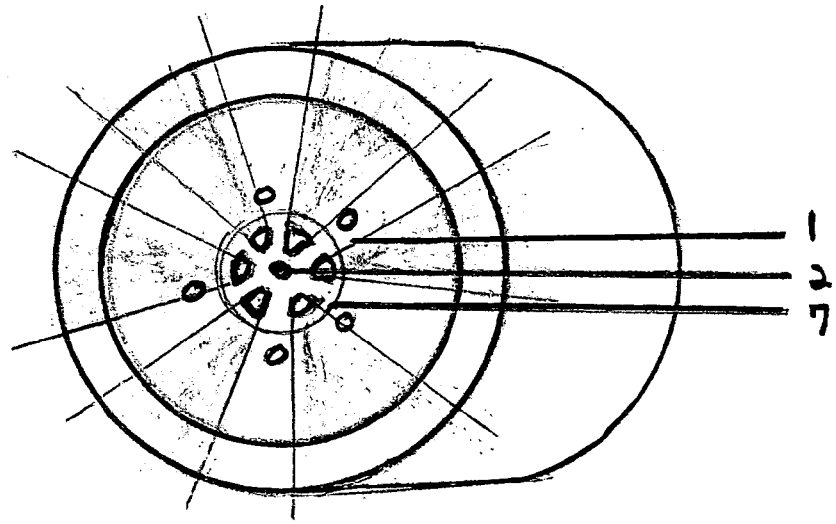
FIG. 5 is what the hub light assembly will look like on an automobile tire.

Referring to FIG. 5, the hub light assembly mounted on an automobile tire.

Figure 6:
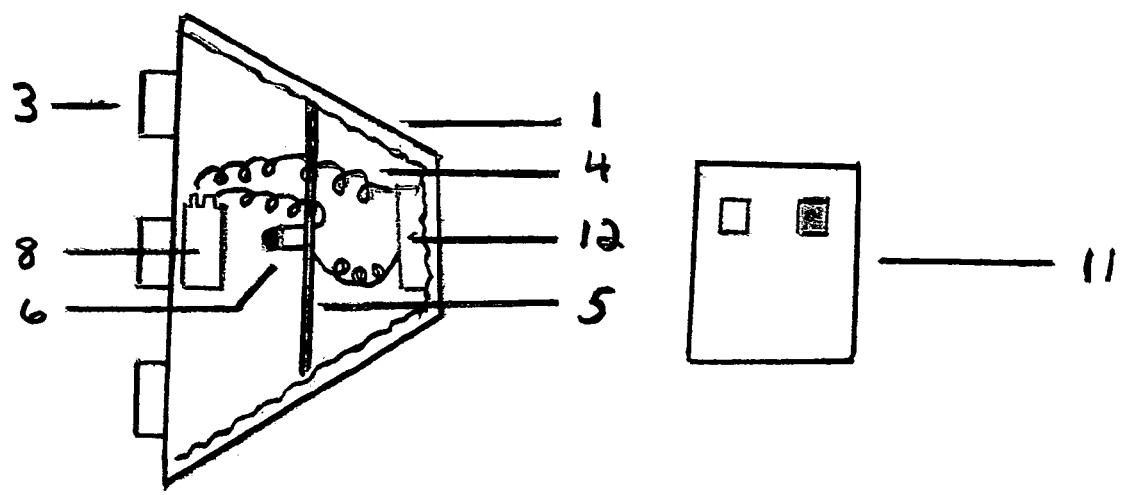
FIG. 6 is a side cross-sectional view of the alternative solar power source and a remote control with a rechargeable battery.

Referring to FIG. 6, the cross-sectioned side view of the solar powered remote control unit. The unit may then be activated with the hand held remote switch.

The completed assembly may be fabricated of aluminum, metal and/or plastic that can be made with varying sizes to accommodate the various diameters of automobile rims.

It is to be understood that the present invention may be made without departing from the spirits thereof or the scope of the claims which follow.

I claim:

1. A lighted center cap mounted on and in combination with a rim or hubcap of a tire comprising:
    (a) a frusto-conical shaped housing having a narrow end and an enlarged end;
    (b) snaps mounted on said enlarged end for attachment to the rim or hubcap of a tire;
    (b) at least one aperture in a side wall of said housing;
    (c) a translucent cover sealing said aperture;
    (d) an electrical circuit mounted within said housing comprising an LED, a battery source of electrical current, and circuitry for delivering electrical current from said battery source to said LED; and
    (e) a switch for turning said LED on an off, said LED when energized providing a soft light for illuminating said tire and hub.

2. The lighted center cap of claim 1 in which said switch is mounted on an outer surface of said narrow end of said housing.

3. The lighted center cap of claim 2 in which said switch is a toggle switch.

4. The lighted center cap of claim 1 in which said switch includes a sensor which energizes said LED at night.

5. The lighted center cap of claim 2 in which said aperture is located adjacent the enlarged end of said housing, a circuit board is mounted within said housing parallel to the ends of said housing dividing the interior of said housing into larger and smaller diameter spaces, the aperture being located as to communicate with the larger diameter space, and said LED being mounted on said circuit board on a side facing said larger diameter space.

6. The lighted center cap of claim 5 in which the side of said circuit board facing said LED has a surface to help distribute the light throughout the housing.

7. The lighted center cap of claim 6 in which said LED emits light of blue, green, or other color.

8. The lighted center cap of claim 7 having a solar powered remote control unit.

* * * * *